United States Patent [19]

Benichou et al.

[11] 4,286,899

[45] Sep. 1, 1981

[54] PROCESS FOR POSITIONING STRENGTHENING RODS IN MINE LEVELS AND PUBLIC WORKS

[75] Inventors: Alain Bénichou, Pontallier sur Saone; Raymond J. Perraud, Villeurbanne, both of France

[73] Assignees: S.A.E.I. Celite, Côte d'Or; Societe d'Etude et de Construction de Machines pour Toutes Industries SECOMA, Rhone, both of France

[21] Appl. No.: 190,652

[22] Filed: Sep. 25, 1980

Related U.S. Application Data

[63] Continuation of Ser. No. 960,647, Nov. 14, 1978, abandoned.

[30] Foreign Application Priority Data

Nov. 14, 1977 [FR] France ............................ 77 34086
Mar. 17, 1978 [FR] France ............................ 78 07763

[51] Int. Cl.$^3$ ............................................. E21D 20/02
[52] U.S. Cl. ..................................... 405/260; 52/744; 106/306; 166/295; 156/73.5; 156/294

[58] Field of Search .................... 52/744; 106/306; 156/294, 73.5, 91, 92, 293; 166/295; 405/260, 261

[56] References Cited

U.S. PATENT DOCUMENTS

| | | | |
|---|---|---|---|
| 3,430,449 | 3/1969 | Novotny et al. | 405/261 |
| 3,930,639 | 1/1976 | Steinberg et al. | 405/261 X |
| 4,127,001 | 11/1978 | Tomic | 405/261 |
| 4,229,124 | 10/1980 | Frey et al. | 405/260 X |

FOREIGN PATENT DOCUMENTS 2218375  9/1974  France .

Primary Examiner—Robert A. Dawson
Attorney, Agent, or Firm—Browdy and Neimark

[57] ABSTRACT

Strengthening rods are positioned in mine levels and public works by introducing into a long bore made in a wall or other surface to be strengthened, a thermosetting resinous composition and a metal rod of substantially the same length as the bore, and rotating the rod at a rotation speed which causes it to heat up by friction with the composition to the hardening temperature of the composition so as to cause the rod to be sealed in the bore by the hardening of the composition.

13 Claims, No Drawings

PROCESS FOR POSITIONING STRENGTHENING RODS IN MINE LEVELS AND PUBLIC WORKS

This is a continuation of application Ser. No. 960,647, filed Nov. 14, 1978, now abandoned.

DESCRIPTION

The present invention relates to improvements to the processes which are currently used for sealing in ground which is to be consolidated, such as the wall or roof of a mine level, of a tunnel or of any equivalent public works, a strengthening rod which may be made of metal or other material, for example polyester resin reinforced with glass fiber, having a length of the order of 180 to 200 cm, using a synthetic resin composition comprising, on the one hand, the resin itself and fibrous and/or pulverulent fillers, and, on the other hand, chemical additives which cause the solidification and hardening of this composition when the said strengthening rod is introduced into a bore which is made in the said ground for this purpose.

Processes of this type have been known for about ten years and the most recent variations in their application involve, for example, heating the metal rod before introducing it into the bore which has been filled beforehand with the unhardened resinous composition.

Processes of this kind are described, in particular, in French Patent Application Nos. 73/05,477 (French Pat. No. 2,218,375) and 76/08,306.

The first of these Patents describes a process in which the resinous composition introduced into the bore consists of a polyester resin, a hardener, which is stable at ambient temperature, and a stabiliser, the whole being packaged in an envelope consisting of a flexible film, which is made rigid by means of a friable plastic net, whereas the element made of metal is heated to a temperature of the order of 200° C. before it is introduced into the bore, this introduction simultaneously causing the breaking of the rigid envelope, the mixing of the constituents of the composition and the hardening of the latter around the element made of metal.

In the second of these Patents, the resinous composition can be injected loose into the bore, and the metal rod can be heated on the surface by passing it through an electric induction furnace. This makes it possible to avoid any rotation of the rod to be sealed, and the latter can even be positioned by hand in the case of elements having non-circular cross-sections.

In contrast to these processes, the present invention makes it possible to mechanize completely the positioning of the rods, while avoiding any installation for heating the rods beforehand.

In fact, it is well known that, at the present time, the equipment used for the introduction of the rods into the bolt holes is the same as that used for the actual drilling of these holes, that is to say heads for causing the rotation of either the drill rods or the supporting bolts, the speed of which is of the order of a few hundred revolutions/minute. As a result, the heat energy which can be generated by the rubbing of the rod in contact with the fillers in the resin composition at the moment of introduction of this rod, which has already been heated beforehand to the hardening temperature of the composition, is so low that it does not cause any appreciable additional heating of the composition and therefore has not been used to any advantage whatsoever in the formulation and use of this type of composition.

In addition, this type of composition possesses thixotropic properties and, as a result of the effect of the agitation caused by the introduction of the rod, its viscosity decreases and, consequently, the frictional energy transferred to the rod decreases even more.

It therefore hitherto appeared impossible to use to advantage, or even to take into consideration, any heat generated by rotation of the rod for initiating the hardening of the resin, and it therefore seemed necessary to heat the rod before introducing it into the mine hole.

Experiments carried out on pilot equipment, in the absence of marketed industrial equipment capable of creating the phenomenon, have made it possible to ascertain that, if metal rods, which have not been heated beforehand but have been brought to rotation speeds which are substantially greater than the customary speeds mentioned above, within a range depending on the properties of solidification by polymerization of these compositions as will be specified below, and despite the abovementioned phenomenon of thixotropy, are introduced into resinous compositions which contain certain proportions of stable abrasive fillers and catalyst and are confined in mine holes, the heat energy resulting from the rubbing of the rod against the said fillers causes the rod to heat up to such a point that the catalytic hardening reaction is intitiated and solidification of the composition, which ensures the sealing of the rod, takes place within the same periods of time as in the case of the introduction of a preheated rod.

The present invention therefore provides a process for positioning a strengthening rod in mine levels and public works, which comprises introducing into a long bore made in a wall or other surface to be strengthened, a thermosetting resinous composition and a metal rod of substantially the same length as the bore, and rotating the rod at a rotation speed which causes it to heat up by friction with the composition to the hardening temperature of the composition so as to cause the rod to be sealed in the bore by the hardening of the composition.

Of course, the nature and proportions of the fillers, and also of the catalyst, have to be chosen as a function of the rotation speed of the rod and the relative dimensions of the rod and the bore. However, it has been found that the abrasive effects of quartz sand advantageously complement those of the customary fillers, such as, in particular, chalk, used in the customary proportions, that is to say of the order of 50% of the composition.

In fact, the experimental analysis of the phenomenon has established that three variable factors must be taken into consideration in this phenomenon, namely:

(1) the fluidity of the composition,
(2) the rotation time of the rod, and
(3) the rotation speed of the rod.

The first factor itself involves two aspects, namely:

(a) the nature of the composition, and
(b) the age of the composition.

Thus, as regards (a), the composition can be of the conventional type having two phases (resin+accelerator in one phase and catalyst+filler in the other), or a single phase (all the components being combined), with charges of varying nature and proportions, the single-phase filler being more advantageous because it is more economical and more convenient to handle.

As regards (b), it is known that the fluidity of a composition of this kind decreases with time.

Whatever the conditions, since (a) and (b) are determined and/or controlled, the parameter (1) above can be considered as being fixed for the purpose of assessing the conditions for carrying out the invention in practice.

As a result, for any given composition, it is possible to establish a relationship of the type:

$$y = Ax + B \quad (1)$$

between the polymerization time, that is to say the time for solidification of the resin and sealing of the rod, y, expressed in seconds, and the rotation speed x of the rod, expressed in revolutions per minute; this relationship can be verified within the limits of experimental error over a wide range of practical conditions.

Thus, for example, experiments were carried out, in which a rod having a diameter of 18 mm and a length of 1.80 meters, driven into a hole having a diameter of 22 mm and a length of 1.70 meters, was sealed using a charge having the following constitution by weight:

| A: | Matrix (composition of the resin) = | |
|---|---|---|
| | Unsaturated polyester resin (UKAPON T - 120 S) | 17.29% of the composition |
| | TRIGONOX 22 B 50 (1,1-di-tert.-butylcyclohexane peroxide) | 2% of the resin |
| | BISOXOL (2,6-di-tert.-butyl-p-cresol) | 0.1% of the resin |
| | AEROSIL 200 (colloidal silica of specific surface area: 100 m²/g) | 2% of the resin |
| B: | Overall composition = | |
| | Matrix A | 18% |
| | Chalk GY 100 | 65.6% |
| | Quartz sand 16-14-2 | 16.4% | at increasing rotation speeds of between about 800 and 2,400 revolutions/minute.

The results of these experiments were as follows:

| Rotation speed (revolutions/minute) | Blocking time (seconds) |
|---|---|
| 800 | 53.7 |
| 1,209 | 48.5 |
| 1,618 | 39.5 |
| 2,021 | 42 |
| 2,413 | 35 |

In the case of this composition, equation (1) can then be expressed as follows:

$$y = -0.01 x + 61.08 \quad (2)$$

with a correlation coefficient of $-0.94$, that is to say an accuracy of about 94%. Thus, application of the formula (2) to speeds comparable to those of the abovementioned experiments gives the theoretical results:

| Rotation speed (revolutions/minute) | Time (seconds) |
|---|---|
| 800 | 52.5 |
| 1,600 | 44 |
| 2,400 | 35 |

Rotation speeds of even less than 800 revolutions/minute, which can be as low as 500 revolutions/minute, can be envisaged and this would obviously cause substantially longer solidification times; however, this can prove useful in the case of the difficult positioning of, for example, pieces of large dimension. These rotation speeds could also be applied with resin compositions having a very high polymerization rate.

Whatever the conditions, the user will be able to vary the solidification time of his seals as a function of the various positioning parameters, the ageing of the sealing charges and the proportion and nature of the inorganic fillers.

In practice, the most advantageous proportions of these fillers, relative to the total weight of the composition, fall within the following ranges:

| chalk | 40 to 70% |
|---|---|
| quartz sand | 10 to 40% |

Three formulations suitable for carrying out the process according to the invention are described below by way of example. These formulations each contain a certain proportion of a resin composition as defined below, which will hereafter be denoted by the term "MATRIX".

| Unsaturated polyester resin | 100 parts by weight |
|---|---|
| Colloidal silica | 1.5 parts by weight |
| Catalyst: tert.-butyl perbenzoate | 1 part by weight |
| Inhibitor: 2,6-di-tert.-butyl-para-cresol | 0.1 part by weight |

The products sold in FRANCE under the trademarks UKAPON 77 064 or UKAPON T 120 Sl (Ugine-Kuhlmann) and NORSODYNE 904, 905 or 907 (CDF-Chimie) can be used, with equivalent results, as the unsaturated polyester resin.

Equivalent amounts of 1,1-di-tert.-butyl-cyclohexane peroxide or tert.-butyl peroctoate, or of any other catalyst which improves the stability of the composition with respect to the natural impurities in the inorganic fillers, can be used as the catalyst.

On the other hand, the abovementioned inhibitor is preferable, in particular to those of the hydroquinone type, in view of the ageing experiments carried out on the composition. The indicated dose of 1,000 ppm can, moreover, be reduced to 500 ppm, taking account of the reactivity of the resin.

The three formulations below were subjected to experiments in which a bolt, having a diameter of 18 mm, was positioned over a length of 1 meter in a metal tube simulating a bore having a diameter of 22 mm, and the results are as follows:

| Formulation No. 1 | |
|---|---|
| MATRIX | 65 parts by weight (20.31%) |
| Chalk 6 Y (OMYA) | 153 parts by weight (47.81%) |
| Quartz sand ref. 16.14.2 (SIKA) | 102 parts by weight (31.88%) |

Viscosity at 20° C.: 870 Poises
Rod introduced for a total of 90 seconds, at 1,600 revolutions/minute during rotation.
Viscosity after 5 to 20 seconds: 380 Poises
Solidification time: 30 seconds

| Formulation No. 2 | |
|---|---|
| MATRIX | 60 parts by weight (19.05%) |
| Chalk 6 Y 100 | 153 parts by weight (48.57%) |

-continued

| Formulation No. 2 | |
|---|---|
| Quartz sand 16.14.2 | 102 parts by weight (32.38%) |

Viscosity at 20° C.: 1,000 Poises
Rod introduced for 60 seconds, at 1,600 revolutions/minute during rotation.
Solidification time: 30 seconds

| Formulation No. 3 | |
|---|---|
| MATRIX | 55 parts by weight (17.74%) |
| Chalk 6 Y 100 | 153 parts by weight (49.35%) |
| Quartz sand | 102 parts by weight (32.90%) |

Viscosity at 20° C.; 1,300 Poises
Rod introduced for a total of 55 seconds, at 1,600 revolutions/minute during rotation.
Viscosity after 5-20 seconds: 475 Poises
Solidification time: at the end of the rotation period
Notes:
(1) The "grade 6 Y 100 (OMYA)" chalk has the following specifications:
particles of less than 150 microns 100%
particles of less than 50 microns 50%
particles of less than 5 microns 30%
(2) The "ref. 16.14.2 (SIKA)" quartz sand has the following specifications:
particles of less than 2,500 microns 100%
particles of less than 1,250 microns 62%
particles of less than 500 microns 0.5%
(3) The quartz sand accentuates the heat effect and the mixture of chalk+sand is calculated so as to be as close as possible to the optimum filling curve, which makes it possible to introduce greater proportions of inorganic fillers into the "MATRIX", while benefiting from a relatively low viscosity, which facilitates the injection of the product.
(4) If instead of injecting the product directly, it is packaged in plastic sheaths, it can be advantageous to introduce thickeners (lime, magnesia, stannous chloride and the like) into the formulation, which raise the viscosity of the product to an essentially constant value.
(5) The duration of stages 3 and 4 of the process (see below) will be shorter as the rotation speed increases.
(6) Instead of only inorganic fillers, it is possible to introduce materials such as wood fibers or asbestos fibers into the formulations, which materials increase the self-heating effect without affecting the rheological properties of the composition.

Finally, the invention can of course be put into practice using resinous compositions supplied as pre-packaged charges, such as those described in the abovementioned French Patent Application No. 73/05,477. However, it is also much simpler to carry out the process using the injection of "loose" compositions such as those described in French Patent Application No. 76/08,306. In this case, according to an embodiment of the invention, the process can be carried out in accordance with a procedure which takes into account the geometric and mechanical requirements associated with the nature of the operation: in fact, it should be considered that this operation consists in sealing, axially in a bore having a depth of about 2 meters, over a diameter of about 20-25 mm, a rod of the same length and having a diameter which is about 4 mm less, by means of a resin charge which is injected beforehand and which, at the end of the operation, must exactly fill all the remaining free space in the bore.

To achieve this result in a virtually ideal manner, the process according to the invention is operated in four stages:

First stage

A volume of the resinous composition, which fills about 35 to 45% of the length of the bore from the bottom, is injected loose into the bore.

Second stage

The rod which is to be anchored in the ground is introduced into the bore, partially filled in this way, so that 50% of its length is "wetted" by the composition.

Third stage

The rod is then rotated about itself at a speed which is preferably between 800 and 2,400 revolutions/minute and over a period of 15 to 60 seconds, which simultaneously causes the heating of the rod, the centrifugation of the resin onto the walls of the bore and the initiation of its polymerization.

Fourth stage

During the following 5 to 30 seconds, the rod is driven into the bottom of the bore without interrupting the rotation, in such a way that, when the rod has been completely driven in, the resin which has been forced out onto its periphery will reach the mouth of the bore; rotation is continued until the resin has completely polymerized, ensuring that the rod is permanently anchored.

This process possesses two variants, depending on whether, in the second stage, the rod is already rotating when it is introduced, or whether it is introduced without any rotation.

The value of the first variant is that it gives rise to a more homogeneous distribution of the composition around the rod, which is advantageous when the constituents of the composition are introduced into the hole separately; it can have the disadvantage that it initiates the polymerization a little too soon when the polymerization rate of the resin is high, which is likely to obstruct the subsequent penetration of the rod.

The second variant obviously possesses the opposite advantages and disadvantages.

The choice of the variant is therefore determined by the use conditions of the process, which are specific to each practical case. Thus, taking account of the fact that the user can now vary the rotation speeds of his new positioning devices for using the sealing charges, he can henceforth use conventional two-phase sealing charges in the same manner (the accelerator being added to the resin and the catalyst being contained in the stick). Thus, starting with a sealing charge of a given type, from the point of view of chemical reactivity, he can vary the solidification time of the mastic simply by changing the rotation speed.

Of course, the invention which has now been described, with reference to a few particular examples, can form the subject of numerous variants which fall within the scope of the claims which follow.

We claim:

1. A process for positioning a strengthening rod in mine levels and public works and the like, which process comprises storing a previously mixed thermosetting resinous composition which includes a resin, an inhibitor, a catalyst and an abrasive filler in an amount sufficient to cause generation of substantial heat upon rotation of a metal rod at about 800 rpm in contact therewith, said composition not being hardenable at room temperature;

introducing into a long bore made in a wall or other surface to be strengthened, said previously mixed thermosetting resinous composition not hardenable at room temperature, and an unpreheated metal rod of substantially the same length as said bore; and rotating said rod at a rotation speed of at least 800 rpm and sufficiently great to cause it and said composition to heat up by friction between the rotating rod and the composition, particularly said abrasive filler, to the hardening temperature of said composition so as to initiate hardening of said thermosetting resinous composition and cause said rod to be sealed in said bore by the hardening of said thermosetting resinous composition as a result of heat generated substantially solely by rotation of said unpreheated rod.

2. Process according to claim 1, in which the blocking (sealing) time of the rod y, expressed in seconds, and the rotation speed x of the rod, expressed in revolutions/minute, are associated by the relationship:

$$y = Ax + B$$

in which A and B are coefficients depending on the nature and proportion of the inorganic fillers present in the resinous composition and on the age of the said composition.

3. Process according to claim 2, in which the values of the parameters A and B are substantially as follows:
$A = -0.01$ $B = 61.08$ 4. Process according to claim 1, in which the resinous composition contains, as inorganic fillers:
chalk in a proportion of 40 to 70% of the weight of the composition, quartz sand in a proportion of 10 to 40% of the weight of the composition, and sufficient resinous binder to form a matrix for the said fillers.

5. Process according to claim 1, in which the resinous composition has the following constitution by weight:

| Resinous binder (Matrix A) | |
|---|---|
| Unsaturated Polyester Resin | 17.29% of the composition |
| 1,1-di-tert.-butylcyclohexane peroxide | 2% of the resin |
| 2,6-di-tert.-butyl-p-cresol | 0.1% of the resin |
| Colloidal silica of specific surface area 100 m²/g | 2% of the resin |
| Overall Composition | |
| Matrix A | 18% |
| Chalk | 65.6% |
| Quartz sand (16-14-2) | 16.4% |

6. Process according to claim 1, in which the resinous composition has the following constitution:

| Resinous binder (Matrix) | |
|---|---|
| Unsaturated Polyester Resin | 100 parts by weight |
| Colloidal silica | 1.5 parts by weight |
| tert.-butyl perbenzoate (catalyst) | 1 part by weight |
| 2,6-di-tert.-butyl-para-cresol (Inhibitor) | 0.1 part by weight |
| Overall Composition | |
| Matrix | 65 parts by weight (20.31%) |
| Chalk (6 Y 100,) | 153 parts by weight (47.81%) |
| Quartz sand (16.14.2) | 102 parts by weight (31.88%) |

7. Process according to claim 1, in which the resinous composition has the following constitution:

| Resinous binder (Matrix) | |
|---|---|
| Unsaturated Polyester Resin | 100 parts by weight |
| Colloidal silica | 1.5 parts by weight |
| tert.-butyl perbenzoate (catalyst) | 1 part by weight |
| 2,6-di-tert.-butyl-para-cresol (Inhibitor) | 0.1 part by weight |
| Overall Composition | |
| Matrix | 60 parts by weight (19.05%) |
| Chalk (6 Y 100) | 153 parts by weight (48.57%) |
| Quartz sand (16.14.2) | 102 parts by weight (32.38%) |

8. Process according to claim 1, in which the resinous composition has the following constitution:

| Resinous binder (Matrix) | |
|---|---|
| Unsaturated Polyester Resin | 100 parts by weight |
| Colloidal silica | 1.5 parts by weight |
| tert.-butyl perbenzoate (catalyst) | 1 part by weight |
| 2,6-di-tert.-butyl-para-cresol (Inhibitor) | 0.1 part by weight |
| Overall Composition | |
| Matrix | 55 parts by weight (17.74%) |
| Chalk (6 Y 100) | 153 parts by weight (49.35%) |
| Quartz sand | 102 parts by weight (32.90%) |

9. Process according to claim 1 in which the rod is rotated at a speed of between 800 and 3,000 revolutions/minute.

10. Process according to claim 1, which comprises four successive stages, namely:
a first stage, in which the resinous composition is injected loose into the bore, so as to fill 35 to 45% of the latter from the bottom;
a second stage, in which the rod which is to be sealed is introduced into the partially filled bore, so that about 50% of its length is "wetted" by the resin;

a third stage, in which the rod is rotated at 800 to 2,400 revolutions/minute over a period of about 15 to 60 seconds; and a fourth stage, in which the rod is completely driven into the bottom of the hole, while continuing the rotation until the resin has completely polymerized.

11. Process according to claim 10, in which in the second stage, the rod is introduced into the hole without rotation.

12. Process according to claim 10 in which in the second stage, the rod is introduced into the hole while it is rotating.

13. Process according to claim 1, in which the resinous composition has a single phase, and all the constituents are combined and injected simultaneously into the hole.

* * * * *